United States Patent
Mimura et al.

(10) Patent No.: US 11,377,124 B2
(45) Date of Patent: Jul. 5, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yoshitaka Mimura, Wako (JP); Katsuyasu Yamane, Wako (JP); Hiroshi Yamanaka, Wako (JP); Chie Sugihara, Tokyo (JP); Yuki Motegi, Tokyo (JP); Tsubasa Shibauchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 116 days.

(21) Appl. No.: 16/807,207

(22) Filed: Mar. 3, 2020

(65) Prior Publication Data
US 2020/0283029 A1    Sep. 10, 2020

(30) Foreign Application Priority Data
Mar. 7, 2019  (JP) .............................. JP2019-041628

(51) Int. Cl.
*B60W 60/00*  (2020.01)
*B60W 10/04*  (2006.01)
(Continued)

(52) U.S. Cl.
CPC ...... *B60W 60/00253* (2020.02); *B60W 10/04* (2013.01); *B60W 10/20* (2013.01);
(Continued)

(58) Field of Classification Search
None
See application file for complete search history.

(56) References Cited

U.S. PATENT DOCUMENTS 10,081,390 B1 *  9/2018  Anderson ............ B62D 15/028
10,628,641 B2 *  4/2020  Knotts ............... G06K 7/10297
(Continued)

FOREIGN PATENT DOCUMENTS

JP    2007-001724    1/2007
JP    2011-164665    8/2011
(Continued)

OTHER PUBLICATIONS

Japanese Office Action for Japanese Patent Application No. 2019-041628 dated Apr. 19, 2022.

*Primary Examiner* — Tamara L Weber
(74) *Attorney, Agent, or Firm* — Amin, Turocy & Watson, LLP

(57) ABSTRACT

A vehicle control device includes a recognizer configured to recognize at least a surroundings situation and an in-vehicle situation of a vehicle, and a driving controller configured to perform at least one of speed control and steering control of the vehicle on the basis of a recognition result of the recognizer, the recognizer is configured to recognize an object to be loaded including at least any one of an occupant candidate present outside the vehicle and scheduled to board the vehicle and a baggage candidate present outside the vehicle and scheduled to be loaded into the vehicle, and to recognize that the object to be loaded has been loaded into the vehicle, and the driving controller is configured to permit start of travel of the vehicle in a case where the recognizer has recognized that all of the objects to be loaded have been loaded into the vehicle.

11 Claims, 10 Drawing Sheets

(51) Int. Cl.
  *B60W 10/20* (2006.01)
  *G06V 20/59* (2022.01)
  *H04W 4/80* (2018.01)
  *G05D 1/00* (2006.01)

(52) U.S. Cl.
  CPC ....... *G06V 20/593* (2022.01); *B60W 2420/42* (2013.01); *B60W 2540/041* (2020.02); *B60W 2540/215* (2020.02); *G05D 1/0088* (2013.01); *G05D 2201/0213* (2013.01); *H04W 4/80* (2018.02)

(56) References Cited

U.S. PATENT DOCUMENTS

| | | | |
|---|---|---|---|
| 2019/0217855 A1* | 7/2019 | Kim | G06K 9/00838 |
| 2020/0081433 A1* | 3/2020 | Sun | G06Q 10/02 |
| 2020/0198620 A1* | 6/2020 | Nakata | H04W 4/024 |

FOREIGN PATENT DOCUMENTS

| | | |
|---|---|---|
| JP | 2017-126118 | 7/2017 |
| JP | 2018-106315 | 7/2018 |

\* cited by examiner

VEHICLE CONTROL DEVICE, VEHICLE CONTROL METHOD, AND STORAGE MEDIUM

CROSS-REFERENCE TO RELATED APPLICATION

This application claims priority to and the benefit from Japanese Patent Application No. 2019-041628, filed on Mar. 7, 2019, the contents of which are hereby incorporated by reference into the present application.

BACKGROUND OF THE INVENTION

Field of the Invention

The present invention relates to a vehicle control device, a vehicle control method, and a storage medium.

Description of Related Art

A technology for acquiring information on baggage to be loaded into a vehicle by an occupant holding a remote key since it is predicted that the occupant is highly likely to board the vehicle when the occupant is approaching the vehicle, and determining whether or not the occupant has gotten off with all baggage carried at the time of boarding, when the occupant gets off is known (see, for example, Japanese Unexamined Patent Application, First Publication No. 2007-1724). In recent years, research on automatically controlling vehicles has progressed.

SUMMARY OF THE INVENTION

However, in the related art, leaving an object behind in a vehicle at the time of getting off the vehicle is prevented. Preventing forgetting to load an object at the time of boarding the vehicle has not been sufficiently studied.

The present invention has been made in view of such circumstances, and an object of the present invention is to provide a vehicle control device, a vehicle control method, and a storage medium capable of preventing forgetting to load baggage and persons to board from being left outside the vehicle at the time of start of automated driving.

A vehicle control device, a vehicle control method, and a storage medium according to the present invention have adopted the following configurations.

(1) A vehicle control device according to an aspect of the present invention includes: a recognizer configured to recognize at least a surroundings situation and an in-vehicle situation of a vehicle; and a driving controller configured to perform at least one of speed control and steering control of the vehicle on the basis of a recognition result of the recognizer, wherein the recognizer is configured to recognize an object to be loaded including at least any one of an occupant candidate present outside the vehicle and scheduled to board the vehicle and a baggage candidate present outside the vehicle and scheduled to be loaded into the vehicle and to recognize that the object to be loaded has been loaded into the vehicle, and the driving controller is configured to permit start of travel of the vehicle in a case where the recognizer has recognized that the object to be loaded has been loaded into the vehicle.

(2) In the aspect (1), the vehicle control device further include a notification controller configured to control an output to notify occupants of the vehicle that the recognizer has recognized that all of objects to be loaded are not loaded into the vehicle in a case where the recognizer has recognized that all of objects to be loaded are not loaded into the vehicle.

(3): In the aspect (2), the vehicle control device may further includes: a receiver configured to receive travel start permission from a user, wherein the driving controller is configured to permit the start of travel of the vehicle in a case where the receiver receives a travel start permission of the user after the notification controller controls the output.

(4) In any one of the aspects (1) to (3), the recognizer is configured to recognize that the object to be loaded has been loaded into the vehicle on the basis of a detection result of an in-vehicle detector configured to detect an in-vehicle status of the vehicle, and the in-vehicle detector includes at least one of a sensor configured to detect whether or not a seat belt of the vehicle has been used, a camera configured to image the inside of the vehicle, or a pressure sensor mounted on a seat of the vehicle.

(5) In any one of the aspects (1) to (4), the recognizer is configured to recognize a non-boarding person performing a predetermined action among persons recognized around the vehicle, and to exclude the non-boarding person from the objects to be loaded.

(6) In any one of the aspects (1) to (5), the vehicle control device further includes an outside-vehicle camera configured to image the vicinity of the vehicle, wherein the recognizer is configured to recognize that all of the objects to be loaded have been loaded into the vehicle on the basis of an image of the outside-vehicle camera.

(7) In the aspect (6), the recognizer is configured to recognize that all of the objects to be loaded have been loaded into the vehicle on the basis of an image of the vicinity of a door of the vehicle or the vicinity of a baggage compartment of the vehicle.

(8): In the aspect (6) or (7), the recognizer is configured to recognize that all of the objects to be loaded have not been loaded into the vehicle in a case where a predetermined item has been recognized near a door of the vehicle after the occupant candidates have boarded.

(9) In any one of the aspects (1) to (8), the recognizer is configured to recognize a constantly present object among objects recognized around the vehicle, and to exclude the constantly present object from the objects to be loaded.

(10) A vehicle control method using an in-vehicle computer according to an aspect of the present invention includes: recognizing at least a surroundings situation and an in-vehicle situation of a vehicle; performing at least one of speed control and steering control of the vehicle on the basis of the recognition result; recognizing an object to be loaded including at least any one of an occupant candidate present outside the vehicle and scheduled to board the vehicle and a baggage candidate present outside the vehicle and scheduled to be loaded into the vehicle; recognizing that the object to be loaded has been loaded into the vehicle; and permitting start of travel of the vehicle in a case where it has been recognized that the object to be loaded has been loaded into the vehicle.

(11) A non-transitory computer-readable storage medium according to an aspect of the present invention stores a program, the program causing an in-vehicle computer to: recognize at least a surroundings situation and an in-vehicle situation of a vehicle; perform at least one of speed control and steering control of the vehicle on the basis of the recognition result; recognize an object to be loaded including at least any one of an occupant candidate present outside the vehicle and scheduled to board the vehicle and a baggage candidate present outside the vehicle and scheduled to be loaded into the vehicle; recognize that the object to be loaded has been loaded into the vehicle; and permit start of travel of the vehicle in a case where it has been recognized that the object to be loaded has been loaded into the vehicle.

According to (1) to (11), it is possible to prevent loading of baggage from being forgotten or persons to board from being left outside the vehicle at the start of automated driving.

DETAILED DESCRIPTION OF THE INVENTION

Figure 1:
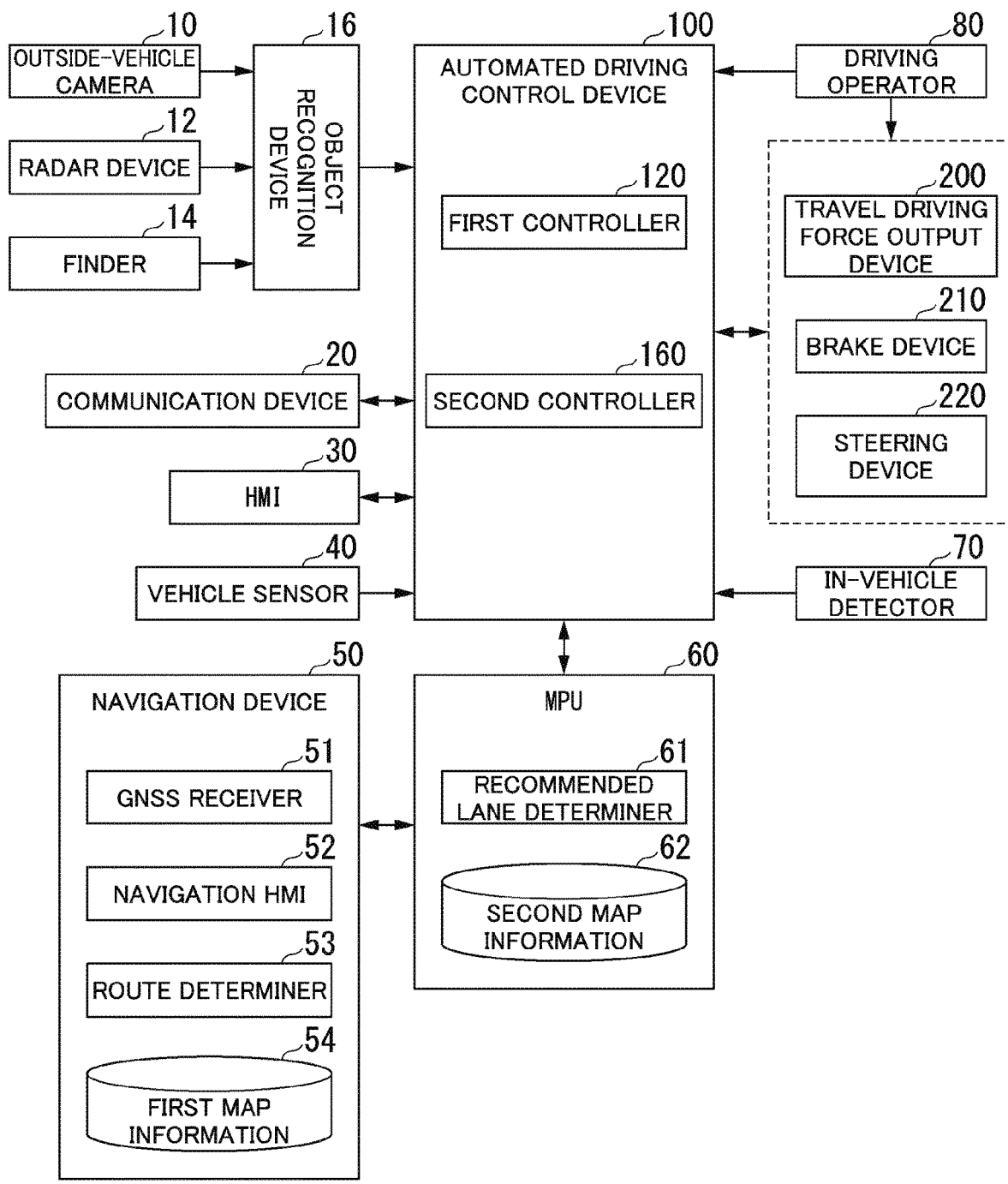
FIG. 1 is a configuration diagram of a vehicle system using a vehicle control device according to an embodiment.

Hereinafter, embodiments of a vehicle control device, a vehicle control method, and a storage medium of the present invention will be described with reference to the drawings.
[Overall Configuration]
FIG. 1 is a configuration diagram of a vehicle system 1 using a vehicle control device according to an embodiment. A vehicle in which the vehicle system 1 is mounted is, for example, a vehicle such as a two-wheeled vehicle, a three-wheeled vehicle, or a four-wheeled vehicle. A driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, an outside-vehicle camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and part of the configuration may be omitted or another configuration may be added.

The outside-vehicle camera 10 is, for example, a digital camera using a solid-state imaging device such as a charge coupled device (CCD) or a complementary metal oxide semiconductor (CMOS). The outside-vehicle camera 10 is attached to any place on a vehicle in which the vehicle system 1 is mounted (hereinafter, a host vehicle M). In the case of forward imaging, the outside-vehicle camera 10 is attached to an upper portion of a front windshield, a rear surface of a rearview mirror, or the like. The outside-vehicle camera 10, for example, periodically and repeatedly images surroundings of the host vehicle M. The outside-vehicle camera 10 may be a stereo camera or a 360-degree camera. The outside-vehicle camera 10 captures a bird's eye image of a vehicle as if the vehicle is looked down from above.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any place on the host vehicle M. The radar device 12 may detect a position and a speed of the object using a frequency modulated continuous wave (FM-CW) scheme.

The finder 14 is a light detection and ranging (LIDAR). The finder 14 radiates light to the surroundings of the host vehicle M and measures scattered light. The finder 14 detects a distance to a target on the basis of a time from light emission to light reception. The radiated light is, for example, pulsed laser light. The finder 14 is attached to any place on the host vehicle M.

The object recognition device 16 performs a sensor fusion process on detection results of some or all of the outside-vehicle camera 10, the radar device 12, and the finder 14 to recognize a position, type, speed, and the like of the object. The object recognition device 16 outputs recognition results to the automated driving control device 100. The object recognition device 16 may output the detection results of the outside-vehicle camera 10, the radar device 12, and the finder 14 as they are to the automated driving control device 100. The object recognition device 16 may be omitted from the vehicle system 1.

The communication device 20, for example, communicates with another vehicle or a parking lot management device (to be described below) present around the host vehicle M, or various server devices using a cellular network, a Wi-Fi network, Bluetooth (registered trademark), dedicated short range communication (DSRC), or the like.

The HMI 30 presents various types of information to an occupant of the host vehicle M and receives an input operation from the occupant. The HMI 30 includes various display devices, speakers, buzzers, touch panels, switches, keys, and the like. The HMI 30 may receive an instruction from the user through a manual operation of the user, or may receive an instruction from the user by recognizing a voice of the user.

The vehicle sensor 40 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies a position of the host vehicle M on the basis of a signal received from a GNSS satellite. The position of the host vehicle M may be specified or supplemented by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for progression to a branch destination when there is a branch place in the on-map route.

The second map information 62 is map information with higher accuracy than the first map information 54. The second map information 62 includes, for example, information on a center of the lane or information on a boundary of the lane. Further, the second map information 62 may include road information, traffic regulation information, address information (an address and postal code), facility information, telephone number information, and the like. The second map information 62 may be updated at any time by the communication device 20 communicating with another device.

The in-vehicle detector 70 detects a status of the inside of the vehicle. The inside of the vehicle includes a space in which seats or the like are disposed for person boarding, a baggage compartment for placement of baggage, and the like. The in-vehicle detector 70 includes, for example, at least one of a sensor that detects whether a seat belt is used, a camera that images the inside of the vehicle, and a pressure sensor mounted on the seat. The in-vehicle detector 70 outputs a detection result to the automated driving control device 100.

The driving operator 80 includes, for example, an accelerator pedal, a brake pedal, a shift lever, a steering wheel, a variant steer, a joystick, and other operators. A sensor that detects the amount of operation or the presence or absence of operation is attached to the driving operator 80, and a detection result thereof is output to the automated driving control device 100 or some or all of the travel driving force output device 200, the brake device 210, and the steering device 220.

The automated driving control device 100 includes, for example, a first controller 120, and a second controller 160. The first controller 120 and the second controller 160 are realized, for example, by a hardware processor such as a central processing unit (CPU) or a graphics processing unit (GPU) executing a program (software). Some or all of these components may be realized by hardware (a circuit portion; including circuitry) such as a large scale integration (LSI), an application specific integrated circuit (ASIC), a field-programmable gate array (FPGA) or a graphics processing unit (GPU) or may be realized by software and hardware in cooperation. The program may be stored in a storage device (a storage device having a non-transitory storage medium) such as an HDD or a flash memory of the automated driving control device 100 in advance or may be stored in a detachable storage medium such as a DVD or a CD-ROM and installed in the HDD or the flash memory of the automated driving control device 100 by the storage medium (the non-transitory storage medium) being mounted in a drive device.

Figure 2:
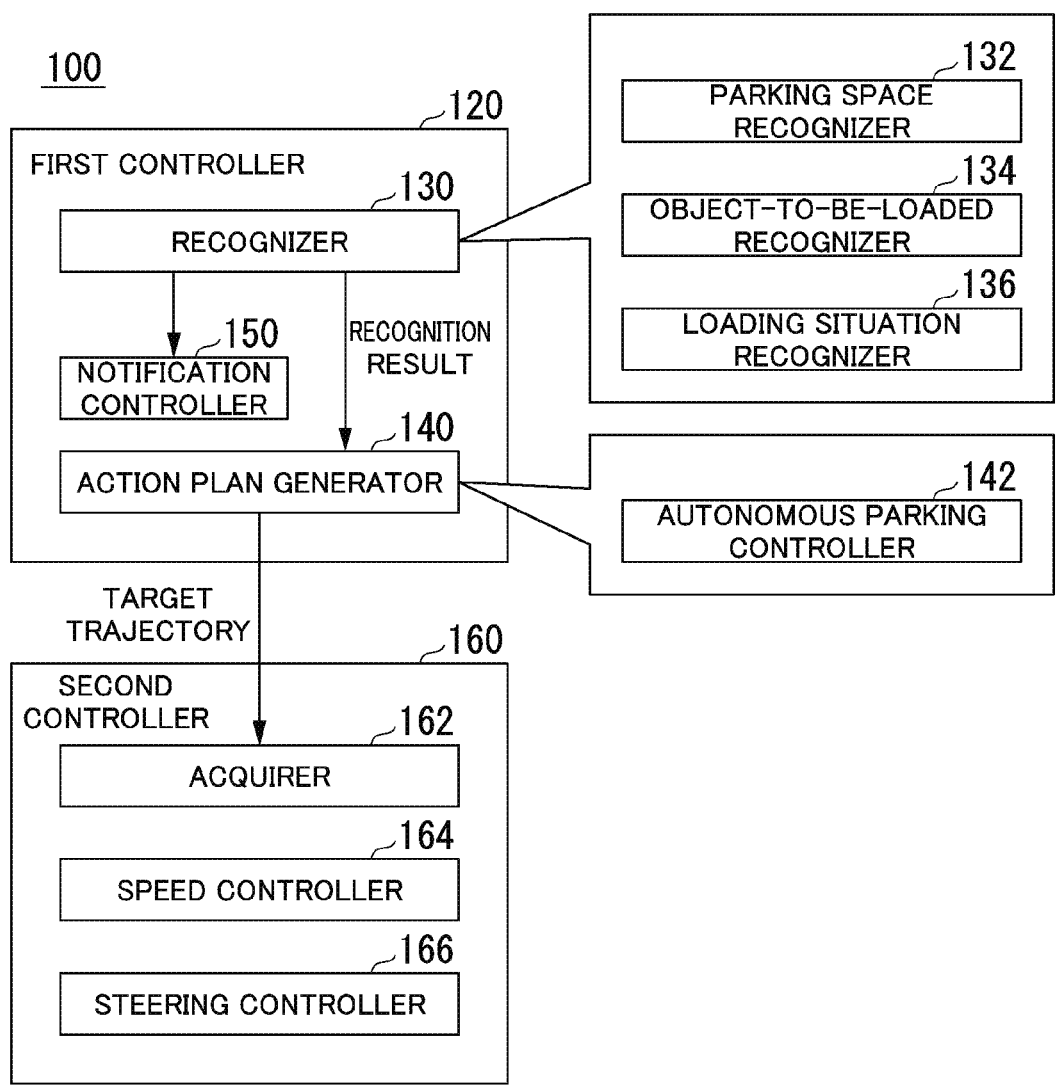
FIG. 2 is a functional configuration diagram of a first controller and a second controller.

FIG. 2 is a functional configuration diagram of the first controller 120 and the second controller 160. The first controller 120 includes, for example, a recognizer 130, an action plan generator 140, and a notification controller 150. The first controller 120 realizes, for example, a function using artificial intelligence (AI) and a function using a previously given model in parallel. For example, a function of "recognizing an intersection" may be realized by recognition of the intersection using deep learning or the like and recognition based on previously given conditions (there is a signal which can be subjected to pattern matching, a road sign, or the like) being executed in parallel and scored for comprehensive evaluation. Accordingly, the reliability of automated driving is guaranteed.

The recognizer 130 recognizes a status such as a position, a speed, or an acceleration of an object around the host vehicle M on the basis of information input from the outside-vehicle camera 10, the radar device 12, and the finder 14 via the object recognition device 16. The position of the object, for example, is recognized as a position at absolute coordinates with a representative point (a centroid, a drive shaft center, or the like) of the host vehicle M as an origin and is used for control. The position of the object may be represented by a representative point such as a centroid or a corner of the object or may be represented by a represented area. The "status" of the object may include an acceleration or jerk of the object, or an "action status" (for example, whether or not the object is changing lanes or is about to change lanes).

The recognizer 130 recognizes, for example, a lane in which the host vehicle M is traveling (travel lane). For example, the recognizer 130 compares a pattern of a road marking line (for example, an arrangement of a solid line and a broken line) obtained from the second map information 62 with a pattern of a road marking line around the host vehicle M recognized from an image captured by the outside-vehicle camera 10 to recognize the travel lane. The recognizer 130 may recognize not only the road marking lines but also a traveling road boundary (a road boundary) including the road marking line, a road shoulder, a curb, a median strip, a guard rail, or the like to recognize the travel lane. In this recognition, the position of the host vehicle M acquired from the navigation device 50 or a processing result of an INS may be additionally considered. Further, the recognizer 130 may recognize a temporary stop line, an obstacle, a red light, a toll gate, and other road events.

The recognizer 130 recognizes a position or posture of the host vehicle M with respect to a travel lane when recognizing the travel lane. The recognizer 130 may recognize, for example, a deviation of a reference point of the host vehicle M from a center of the lane and an angle formed between a traveling direction of the host vehicle M and a line connecting the center of the lane as the relative position and posture of the host vehicle M with respect to the travel lane. Instead, the recognizer 130 may recognize, for example, a position of the reference point of the host vehicle M with respect to any one of side end portions (the road marking line or the road boundary) of the travel lane as the relative position of the host vehicle M with respect to the travel lane.

The recognizer 130 includes, for example, a parking space recognizer 132, an object-to-be-loaded recognizer 134, and a loading situation recognizer 136. Configurations thereof are activated in a self-traveling and parking event to be described below. Details thereof will be described below.

In principle, the action plan generator 140 generates a target trajectory along which the host vehicle M will travel in the future automatically (without depending on an operation of a driver) so that the host vehicle M can travel on the recommended lane determined by the recommended lane determiner 61 and cope with a surroundings situation of the host vehicle M. The target trajectory includes, for example, a speed element. For example, the target trajectory is represented as a sequence of points (trajectory points) to be reached by the host vehicle M. The trajectory point is a point that the host vehicle M is to reach for each predetermined travel distance (for example, several meters) at a road distance, and a target speed and a target acceleration at every predetermined sampling time (for example, every several tenths of a [sec]) are separately generated as a part of the target trajectory. The trajectory point may be a position that the host vehicle M is to reach at the sampling time at every predetermined sampling time. In this case, information on the target speed or the target acceleration is represented by the interval between the trajectory points.

When the action plan generator 140 generates the target trajectory, the action plan generator 140 may set an event of automated driving. Examples of the automated driving event include a constant speed traveling event, a low speed following driving event, a lane changing event, a branching event, a merging event, a takeover event, and a self-traveling and parking event in which a vehicle travels in an unmanned manner and is parked in valet parking or the like. The action plan generator 140 generates a target trajectory according to an activated event. The action plan generator 140 includes an autonomous parking controller 142 that is activated when the self-traveling and parking event is performed. Details of a function of the autonomous parking controller 142 will be described below.

The second controller 160 controls the travel driving force output device 200, the brake device 210, and the steering device 220 so that the host vehicle M passes through the target trajectory generated by the action plan generator 140 at a scheduled time.

The second controller 160 includes, for example, an acquirer 162, a speed controller 164, and a steering controller 166. The acquirer 162 acquires information on the target trajectory (trajectory points) generated by the action plan generator 140 and stores the information on the target trajectory in a memory (not shown). The speed controller 164 controls the travel driving force output device 200 or the brake device 210 on the basis of the speed element incidental to the target trajectory stored in the memory. The steering controller 166 controls the steering device 220 according to a degree of bend of the target trajectory stored in the memory. Processes of the speed controller 164 and the steering controller 166 are realized by, for example, a combination of feedforward control and feedback control. For example, the steering controller 166 executes a combination of feedforward control according to a curvature of a road in front of the host vehicle M and feedback control based on a deviation from the target trajectory.

The travel driving force output device 200 outputs a travel driving force (torque) for traveling of the vehicle to the driving wheels. The travel driving force output device 200 includes, for example, a combination of an internal combustion engine, an electric motor, a transmission, and the like, and an electronic control unit (ECU) that controls these. The ECU controls the above configuration according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second controller 160 or information input from the driving operator 80 so that a brake torque according to a braking operation is output to each wheel. The brake device 210 may include a mechanism that transfers the hydraulic pressure generated by the operation of the brake pedal included in the driving operator 80 to the cylinder via a master cylinder, as a backup. The brake device 210 is not limited to the configuration described above and may be an electronically controlled hydraulic brake device that controls the actuator according to information input from the second controller 160 and transfers the hydraulic pressure of the master cylinder to the cylinder.

The steering device 220 includes, for example, a steering ECU and an electric motor. The electric motor, for example, changes a direction of the steerable wheels by causing a force to act on a rack and pinion mechanism. The steering ECU drives the electric motor according to information input from the second controller 160 or information input from the driving operator 80 to change the direction of the steerable wheels.

[Autonomous Parking Event—at Time of Vehicle Entry]

Figure 3:
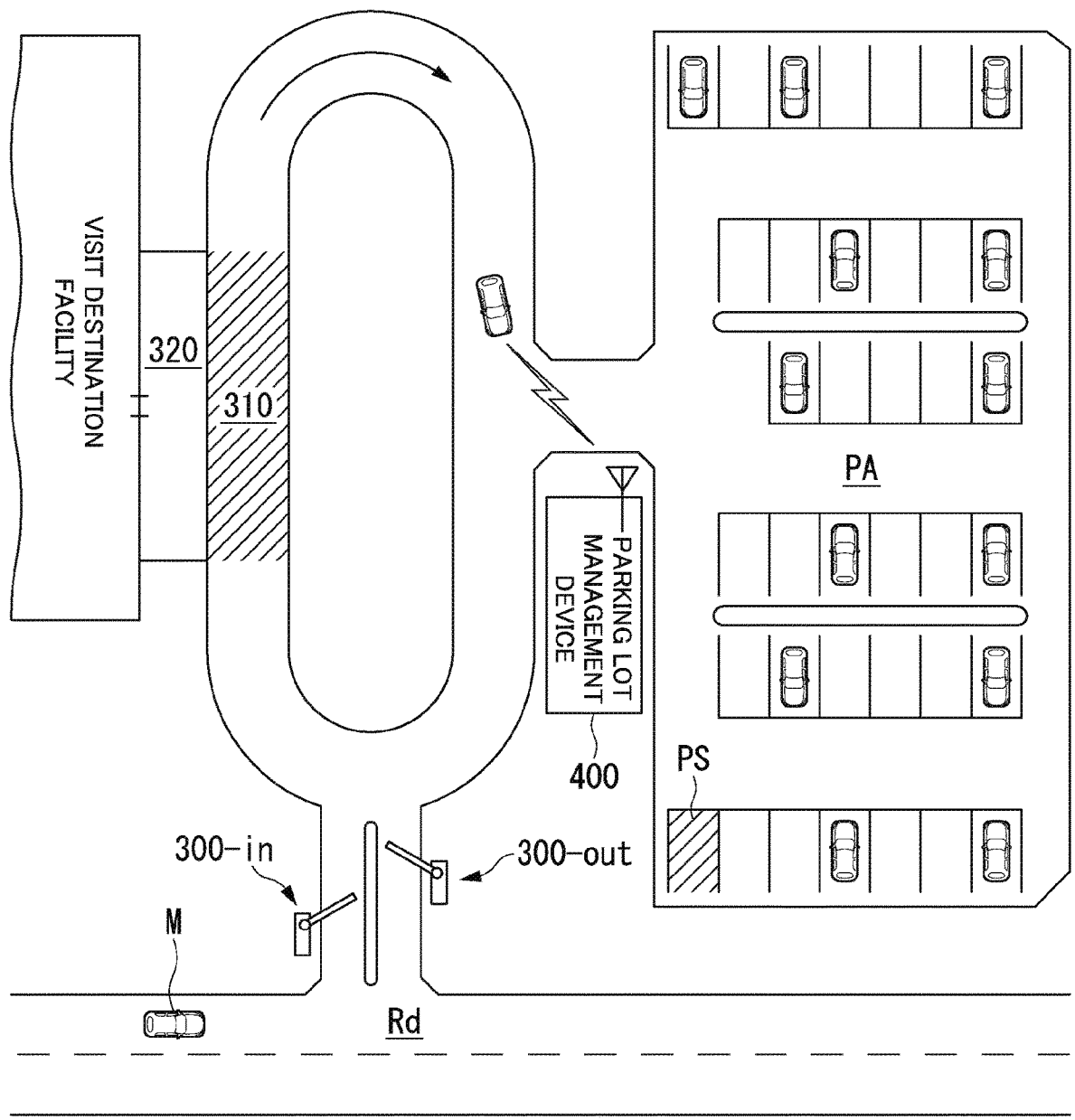
FIG. 3 is a diagram schematically showing a scene in which a self-traveling and parking event is executed.

The autonomous parking controller 142 parks the host vehicle M in the parking space on the basis of information acquired from the parking lot management device 400 by the communication device 20, for example. FIG. 3 is a diagram schematically showing a scene in which the self-traveling and parking event is executed. Gates 300-in and 300-out are provided on a route from a road Rd to a visit destination facility. The host vehicle M advances to a stop area 310 through the gate 300-in according to manual driving or automated driving. The stop area 310 faces a boarding and alighting area 320 connected to the visit destination facility. An eave for avoiding rain or snow is provided in the boarding and alighting area 320.

After the occupant alights in the stop area 310, the host vehicle M starts unmanned automated driving and starts the self-traveling and parking event to move to the parking space PS in a parking lot PA. A start trigger of the self-traveling and parking event may be, for example, any operation of an occupant, or may be wireless reception of a predetermined signal from the parking lot management device 400. When the autonomous parking controller 142 starts the self-traveling and parking event, the autonomous parking controller 142 controls the communication device 20 such that a parking request is transmitted to the parking lot management device 400. The host vehicle M moves from the stop area 310 to the parking lot PA according to guidance of the parking lot management device 400 or while performing its own sensing.

Figure 4:
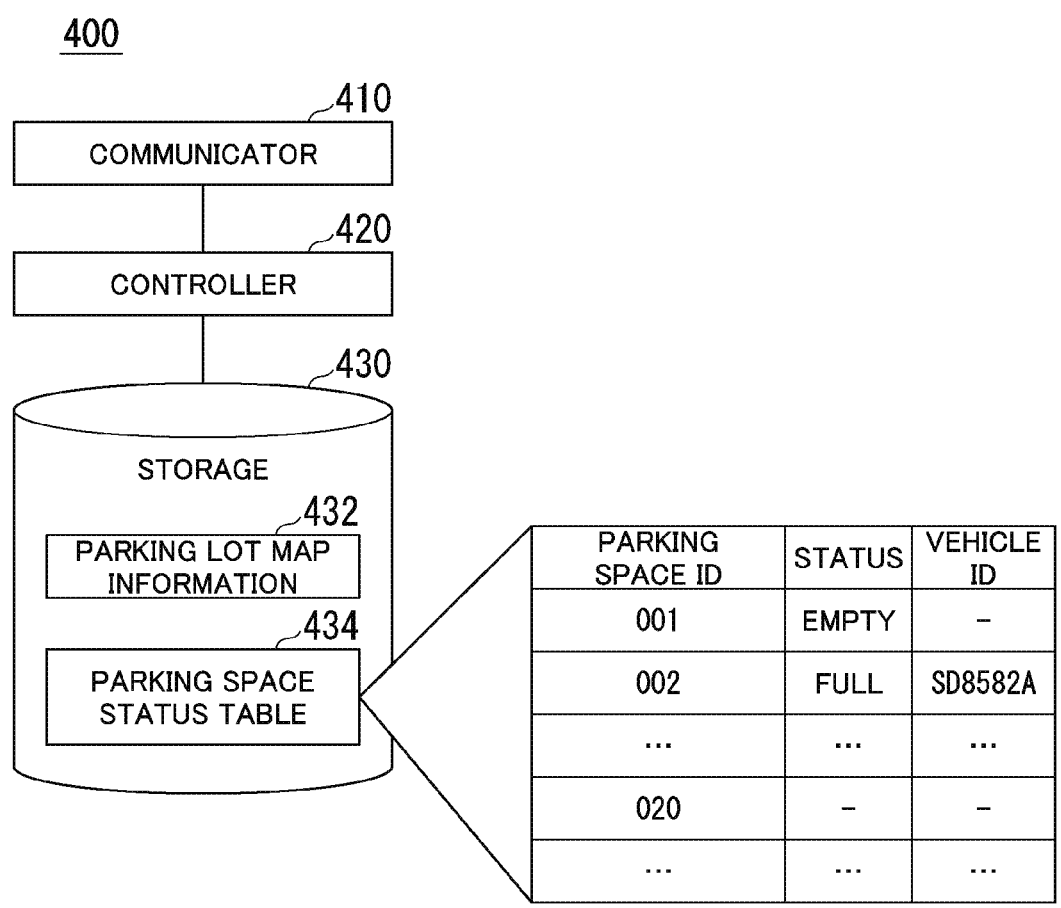
FIG. 4 is a diagram showing an example of a configuration of a parking lot management device.

FIG. 4 is a diagram showing an example of a configuration of the parking lot management device 400. The parking lot management device 400 includes, for example, a communicator 410, a controller 420, and a storage 430. The storage 430 stores information such as parking lot map information 432 and a parking space status table 434.

The communicator 410 wirelessly communicates with the host vehicle M or other vehicles. The controller 420 guides the vehicle to the parking space PS on the basis of the information acquired by communicator 410 and the information stored in storage 430. The parking lot map information 432 is information that geometrically represents a structure of the parking lot PA. The parking lot map information 432 includes coordinates for each parking space PS. The parking space status table 434 is, for example, a table in which a status indicating whether the parking space is in an empty status or a full (parked) status and a vehicle ID that is identification information of parked vehicles when the parking space is full are associated with a parking space ID, which is identification information of the parking space PS.

When the communicator 410 receives the parking request from the vehicle, the controller 420 extracts the parking space PS that is in an empty status by referring to the parking space status table 434, acquires a position of the extracted parking space PS from the parking lot map information 432, and transmits a suitable route to the acquired position of the parking space PS to the vehicle using the communicator 410. The controller 420 instructs a specific vehicle, for example, to stop or slow down, as necessary, on the basis of positional relationships between a plurality of vehicles so that the vehicles do not advance to the same position at the same time.

In a vehicle (hereinafter, referred to as the host vehicle M) that has received the route, the autonomous parking controller 142 generates a target trajectory based on the route. When the host vehicle M approaches the parking space PS, which is a target, the parking space recognizer 132 recognizes parking frame lines or the like that partition the parking space PS, recognizes a specific position of the parking space PS, and provides the position to the autonomous parking controller 142. The autonomous parking controller 142 receives the position, corrects the target trajectory, and parks the host vehicle M in the parking space PS.

[Autonomous Parking Event—at Time of Exit]

The autonomous parking controller 142 and the communication device 20 remain in an operating state even when the host vehicle M is parked. The autonomous parking controller 142 activates a system of the host vehicle M and moves the host vehicle M to the stop area 310, for example, when the communication device 20 receives a vehicle pick-up request from a terminal device of the occupant. In this case, the autonomous parking controller 142 controls the communication device 20 such that a start request is transmitted to the parking lot management device 400. The controller 420 of the parking lot management device 400 instructs a specific vehicle, for example, to stop or slow down, as necessary, on the basis of positional relationships between a plurality of vehicles so that the vehicles do not advance to the same position at the same time, similar to the time of vehicle entrance. When the host vehicle M is moved to the stop area 310 and an occupant boards the host vehicle M, the autonomous parking controller 142 stops an operation, and then, manual driving or automated driving by another functional unit is started.

The present invention is not limited to the above, and the autonomous parking controller 142 may find a parking space in an empty status by itself on the basis of detection results of the outside-vehicle camera 10, the radar device 12, the finder 14, or the object recognition device 16 without depending on communication, and park the host vehicle M in the found parking space.

[Autonomous Parking Event-when Boarding and Loading]

The object-to-be-loaded recognizer 134 recognizes the object to be loaded when an occupant boards the host vehicle M that has automatically exited or when baggage is loaded into the host vehicle M that has automatically exited. For example, the object-to-be-loaded recognizer 134 recognizes the object to be loaded on the basis of an image obtained by imaging the surroundings of the host vehicle M or an image obtained by imaging the vicinity of a door of the host vehicle M. The object to be loaded includes any one of an occupant candidate and a baggage candidate. The occupant candidate is a person who is present outside the host vehicle M and a person scheduled to board the host vehicle M (a person likely to board the vehicle). The baggage candidate is an object that is present outside the host vehicle M and is baggage to be loaded into the host vehicle M.

For example, the object-to-be-loaded recognizer 134 recognizes a person satisfying conditions of a regular user among persons standing in the stop area 310 and persons approaching the host vehicle M, as the occupant candidate. When the conditions of a regular user are satisfied, this indicates that a person is a regular user who is permitted to get on the host vehicle M. When the conditions of a regular user are satisfied, for example, the person is recognized as a user of the host vehicle M using a face authentication technology based on feature information registered in advance. The present invention is not limited thereto, and when the conditions of a regular user are satisfied, the person may possess an electronic key for remotely operating a key of the door of the host vehicle M and the person may execute a gesture or action registered in advance. In the former case, the object-to-be-loaded recognizer 134 authenticates the person as a regular user on the basis of, for example, a result of comparison between information received from the electronic key and information registered in advance. In the latter case, the object-to-be-loaded recognizer 134 authenticates the person as a regular user by analyzing an image using, for example, a pattern matching technology.

The object-to-be-loaded recognizer 134 recognizes not only a person satisfying the conditions of a regular user but also a person who is together with the person satisfying the conditions of a regular user (hereinafter referred to as a regular companion) as the occupant candidate. For example, the object-to-be-loaded recognizer 134 may recognize, as occupant candidates, a person within a predetermined range from a person satisfying the conditions of a regular user, a person walking in the same direction as the person satisfying the conditions of a regular user, a person walking at the same speed as the person satisfying the conditions of a regular user, a person likely to have a conversation with the person satisfying the conditions of a regular user, and the like.

On the other hand, the object-to-be-loaded recognizer 134 may exclude, from the occupant candidates, persons taking an action likely not to be taken by a person who is with a person satisfying the conditions of a regular user, such as a person away from the host vehicle M, a person turning his or her back to the host vehicle M, or a person standing alone (for example, a clerk) even though such a person is in the vicinity in a predetermined range including persons satisfying the conditions of a regular user. A person who is not a companion of such a regular user is described as an exclusion target.

The object-to-be-loaded recognizer 134 may recognize a person performing a predetermined non-boarding action (hereinafter referred to as a non-boarding person) among the persons recognized around the host vehicle, and exclude the non-boarding person from the occupant candidates. The non-boarding persons include a person who is seeing off, a person who has placed baggage in a host vehicle M, a staff member who has provided guidance, and the like. The predetermined non-boarding action includes, for example, an operation of waving a hand, for example, to point in a travel start direction of the host vehicle M, and an operation of standing in the same place around the host vehicle M during a predetermined time or more.

When the occupant candidates have been recognized, the object-to-be-loaded recognizer 134 derives the number of occupant candidates. For example, the object-to-be-loaded recognizer 134 derives a total number of persons included in the occupant candidates. Here, the object-to-be-loaded recognizer 134 may derive the number of persons for each attribute of the persons. For example, the object-to-be-loaded recognizer 134 may derive the respective numbers of babies, children, adults, elderly persons, and the like included in the occupant candidates. The present invention is not limited thereto, and the object-to-be-loaded recognizer 134 may derive the number of persons for each type of clothing. For example, the object-to-be-loaded recognizer 134 may derive the number of persons wearing black clothes, persons wearing whitish clothes, persons wearing warm colored clothes, and persons wearing cool-colored clothes. Thus, the object-to-be-loaded recognizer 134 may extract features of the occupant candidates and classify the occupant candidates for each feature (attribute).

When the object-to-be-loaded recognizer 134 has recognized the occupant candidate, the object-to-be-loaded recognizer 134 recognizes, for example, that baggage held by the occupant candidate is baggage candidate. The present invention is not limited thereto, and the object-to-be-loaded recognizer 134 may recognize that baggage held by the occupant candidate, baggage loaded on a cart pushed by the occupant candidate, or the like is the baggage candidate. The object-to-be-loaded recognizer 134 may recognize that baggage placed around a predetermined range including the occupant candidate is also the baggage candidate.

On the other hand, the object-to-be-loaded recognizer 134 may exclude an object present near the occupant candidate or the host vehicle M, which is a constantly present object (hereinafter referred to as an "installed object") from the baggage candidates. The installed object includes, for example, a bollard, a sign, a pole, and a post. For example, the object-to-be-loaded recognizer 134 excludes an installed object included in an image captured by the outside-vehicle camera 10 from the baggage candidates on the basis of feature information of the installed object registered in advance.

When the baggage candidates have been recognized, the object-to-be-loaded recognizer 134 derives the number of baggage candidates. For example, the object-to-be-loaded recognizer 134 derives a total number of baggage included in the baggage candidates. Here, the object-to-be-loaded recognizer 134 may derive the number of baggage for each container or form such as a bag or a box. The present invention is not limited thereto, and the object-to-be-loaded recognizer 134 may derive the number for each of colors or sizes of the baggage. Thus, the object-to-be-loaded recognizer 134 may extract features of the baggage candidates and classify the baggage candidates for each of features (attributes).

The loading situation recognizer 136 recognizes that all of the objects to be loaded recognized by the object-to-be-loaded recognizer 134 have been loaded into the host vehicle M on the basis of, for example, information indicating a situation of the outside of the vehicle (for example, the image captured by the outside-vehicle camera 10) and information indicating a situation of the inside of the vehicle (for example, a detection result of the in-vehicle detector 70). Here, the loading situation recognizer 136 recognizes baggage not loaded into the host vehicle M as a forgotten thing. The loading situation recognizer 136 recognizes a person not loaded into the host vehicle M as a person left outside the vehicle.

For example, the loading situation recognizer 136 recognizes occupants who have boarded the host vehicle M on the basis of the detection result of the in-vehicle detector 70. The loading situation recognizer 136 derives the number of occupants (hereinafter referred to as the number of detected persons inside the vehicle) who have boarded between a time when the boarding start operation has been executed and a time when a boarding completion operation is executed. The boarding start operation includes, for example, unlocking a door, and opening the door. The boarding completion operation includes locking a door, closing the door, and the like. The boarding start operation and the boarding completion operation may be an operation that is executed under the control of the automated driving control device 100 or an operation that is executed by an occupant. For example, the loading situation recognizer 136 derives the number of seats in use as the number of detected persons inside the vehicle on the basis of a detection result of a sensor that detects whether or not a seat belt is used or a seat pressure sensor. The loading situation recognizer 136 may recognize persons on the basis of an image obtained by imaging the inside of the vehicle, and set the number of recognized persons as the number of detected persons inside the vehicle.

When the number of occupant candidates (the number of detected persons outside the vehicle) derived by the object-to-be-loaded recognizer 134 matches the number of detected persons inside the vehicle, the loading situation recognizer 136 recognizes that all the occupant candidates have boarded. On the other hand, when the number of detected persons outside the vehicle does not match the number of detected persons inside the vehicle, the loading situation recognizer 136 recognizes that all of the occupant candidates have not boarded. Here, the loading situation recognizer 136 may determine whether persons included in the occupant candidates match persons who have boarded the host vehicle M on the basis of features classified by the object-to-be-loaded recognizer 134. For example, when the number of detected persons outside the vehicle includes two adults and three children, the loading situation recognizer 136 may determine whether or not the number of detected persons inside the vehicle is 5 and the number of detected persons inside the vehicle matches the number of detected persons outside the vehicle.

The loading situation recognizer 136 recognizes the baggage loaded into the host vehicle M on the basis of the detection result of the in-vehicle detector 70. The loading situation recognizer 136 derives the number of baggage (hereinafter referred to as the number of detected objects inside the vehicle) loaded between a time when the boarding operation has been executed and a time when the boarding complete operation is executed. For example, the loading situation recognizer 136 recognizes baggage on the basis of an image obtained by imaging the inside of the vehicle, and sets the number of recognized baggage as the number of detected objects inside the vehicle.

When the number of baggage candidates (the number of detected objects outside the vehicle) derived by the object-to-be-loaded recognizer 134 matches the number of detected objects inside the vehicle, the loading situation recognizer 136 recognizes that all the baggage candidates have been loaded. On the other hand, when the number of detected objects outside the vehicle does not match the number of detected objects inside the vehicle, the loading situation recognizer 136 recognizes that all the baggage candidates have not been loaded. Here, the loading situation recognizer 136 may determine whether the baggage included in the baggage candidates match the baggage loaded into the host vehicle M on the basis of the features classified by the object-to-be-loaded recognizer 134. For example, when the number of detected objects outside the vehicle includes two paper bags and one cardboard object, the loading situation recognizer 136 may determine whether the number of detected objects inside the vehicle is 3 and matches the number of detected objects outside the vehicle.

The notification controller 150 controls the output so that the output notifies the occupant of the host vehicle M that the loading situation recognizer 136 has recognized that all of the objects to be loaded have not been loaded when the loading situation recognizer 136 has recognized that all of the objects to be loaded have not been loaded. For example, the notification controller 150 notifies the occupant, for example, that all of the occupant candidates have not boarded or that all the baggage candidates have not been loaded. The notification controller 150 causes the HMI 30 to output the fact to the inside of the vehicle by voice or image. By doing so, it is possible to notify the occupants that all the occupants are not present or that loading of baggage is likely to be forgotten.

The autonomous parking controller 142 permits the start of travel of the host vehicle M when the loading situation recognizer 136 has recognized that all the necessary objects have been loaded into the host vehicle M. After the autonomous parking controller 142 has permitted the start of travel of the host vehicle M, the autonomous parking controller 142 may start travel of the host vehicle M according to automated driving, or the travel driving force output device 200 or the like may start the travel of the host vehicle M on the basis of an operation amount input using the driving operator 80.

Even when the loading situation recognizer 136 has recognized that all of the objects to be loaded have not been loaded, the autonomous parking controller 142 performs the start of travel of the host vehicle M in a case in which the start of travel of the host vehicle M has been permitted by the occupant of the host vehicle M. For example, when a travel start permission by the HMI 30 has been received from the occupant after the inside of the vehicle has been notified that all of the objects to be loaded have not been loaded by a voice or image using the HMI 30, the autonomous parking controller 142 permits start of travel of the host vehicle M. The "travel start permission by the occupant" includes, for example, a case in which a button instructing the fact has been touched and a case in which speech such as "It is not my baggage" has been detected.
[Process Flow]

Figure 5:
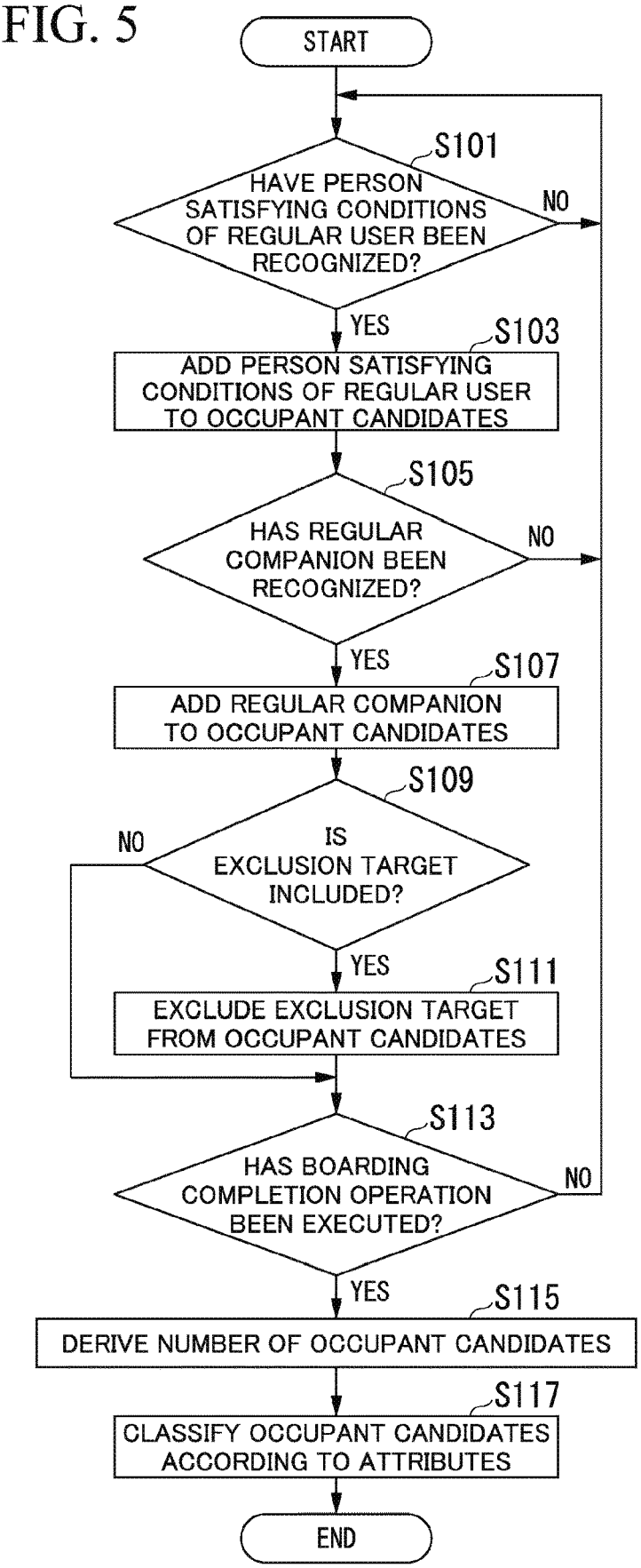
FIG. 5 is a flowchart showing an example of a process in which an occupant candidate is recognized by an object-to-be-loaded recognizer.

FIG. 5 is a flowchart showing an example of a process in which the occupant candidate is recognized by the object-to-be-loaded recognizer 134. First, the object-to-be-loaded recognizer 134 determines whether a person satisfying the conditions of a regular user has been recognized (step S101). When the person satisfying the conditions of a regular user is recognized, the object-to-be-loaded recognizer 134 adds the recognized person to the occupant candidates (step S103). Then, the object-to-be-loaded recognizer 134 determines whether or not a regular companion has been recognized (step S105). When the regular companion has been recognized, the object-to-be-loaded recognizer 134 adds the recognized regular companion to the occupant candidates (step S107). The object-to-be-loaded recognizer 134 determines whether or not an exclusion target is included in the occupant candidates (step S109). When an exclusion target is included in the occupant candidates, the object-to-be-loaded recognizer 134 excludes the exclusion target from the occupant candidates (step S111).

Then, the object-to-be-loaded recognizer 134 determines whether or not the boarding completion operation has been executed (step S113). When the boarding completion operation has not been executed, the object-to-be-loaded recognizer 134 returns to the process of step S101 and repeats the process. When the boarding completion operation has been executed, the object-to-be-loaded recognizer 134 derives the number of occupant candidates (step S115). The object-to-be-loaded recognizer 134 may further classify the occupant candidates according to features or attributes (step S117).

Figure 6:
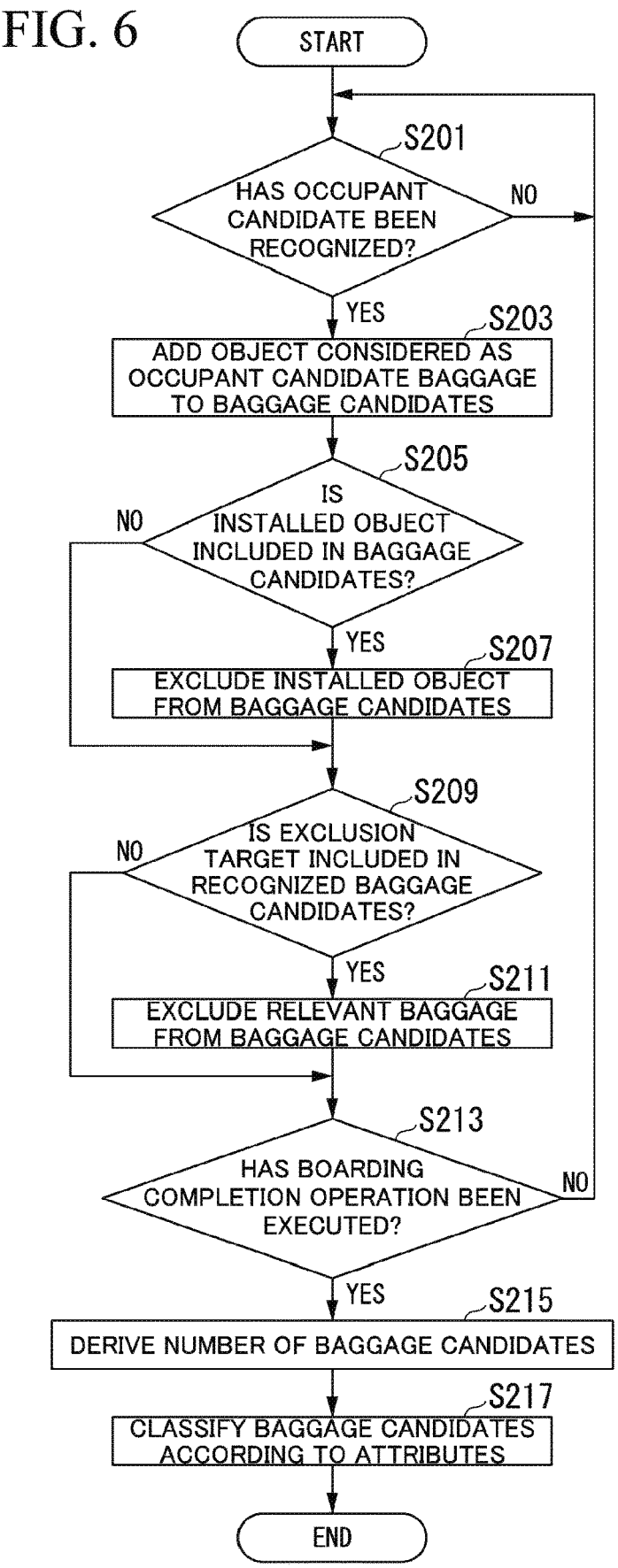
FIG. 6 is a flowchart showing an example of a process in which a baggage candidate is recognized by an object-to-be-loaded recognizer.

FIG. 6 is a flowchart showing an example of a process in which the object-to-be-loaded recognizer 134 recognizes baggage candidates. This process is executed in parallel with the process described above with reference to FIG. 5.

First, the object-to-be-loaded recognizer 134 determines whether the occupant candidate has been recognized (step S201). When the occupant candidate has been recognized, the object-to-be-loaded recognizer 134 adds, to the baggage candidates, an object considered to be loaded into the host vehicle M (step S203). Then, the object-to-be-loaded recognizer 134 determines whether an installed object is included in the baggage candidates (step S205). When the installed object is included in the baggage candidates, the object-to-be-loaded recognizer 134 excludes the installed object from the baggage candidates (step S207). Then, the object-to-be-loaded recognizer 134 determines whether or not the baggage excluded as an exclusion target is included in the recognized baggage candidates (step S209). When the baggage excluded as an exclusion target is included in the baggage candidates, the object-to-be-loaded recognizer 134 excludes the baggage relevant to the exclusion target (for example, baggage present around the exclusion target and added as the baggage candidate) from the baggage candidates (step S211).

Then, the object-to-be-loaded recognizer 134 determines whether or not the boarding completion operation has been executed (step S213). When the boarding completion operation has not been executed, the object-to-be-loaded recognizer 134 returns to the process of step S201 and repeats the process. When the boarding completion operation has been executed, the object-to-be-loaded recognizer 134 derives the number of baggage candidates (step S215). The object-to-be-loaded recognizer 134 may further classify the baggage candidates according to features or attributes (step S217).

Figure 7:
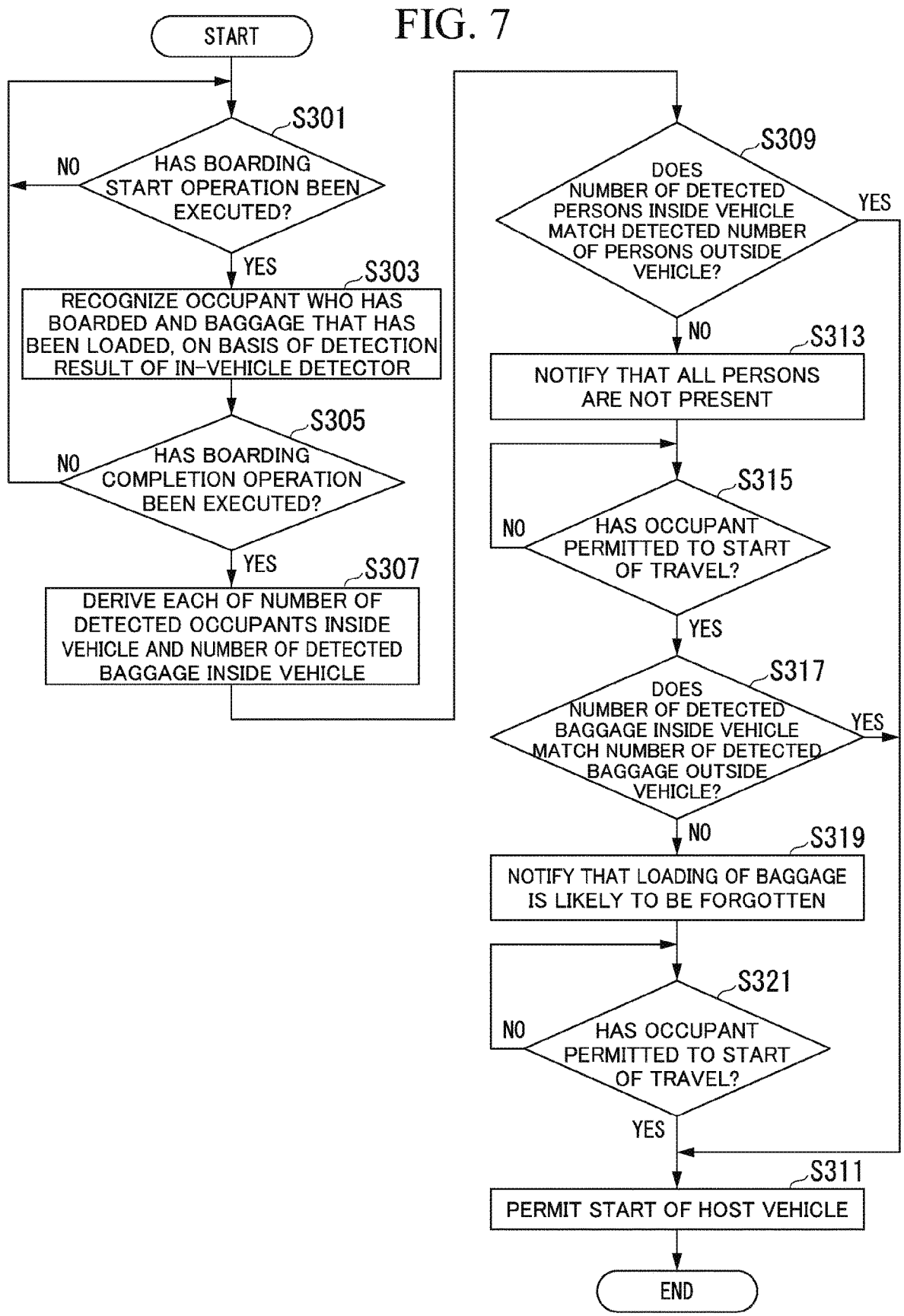
FIG. 7 is a flowchart showing an example of a process of a loading situation recognizer.

FIG. 7 is a flowchart showing an example of a process of the loading situation recognizer 136. This process is executed in parallel with the process described above with reference to FIGS. 5 and 6.

The loading situation recognizer 136 determines whether or not the boarding start operation has been executed (step S301). For example, when the host vehicle M stops at a stop position and the door is opened, the loading situation recognizer 136 determines that the boarding start operation has been executed. When the boarding start operation has been executed, the loading situation recognizer 136 recognizes an occupant who has boarded and baggage that has been loaded, on the basis of the detection result of the in-vehicle detector 70 (step S303). The loading situation recognizer 136 determines whether or not the boarding completion operation has been executed (step S305). When the boarding completion operation has not been executed, the loading situation recognizer 136 returns to step S301 and repeats the process. When the boarding completion operation has been executed, the loading situation recognizer 136 derives each of the number of detected occupants inside the vehicle and the number of detected baggage inside the vehicle (step S307).

The loading situation recognizer 136 determines whether or not the derived the number of detected persons inside the vehicle matches the number of detected persons outside the vehicle derived by the object-to-be-loaded recognizer 134 (step S309). Here, the loading situation recognizer 136 may determine whether or not the number of detected persons inside the vehicle matches the number of detected persons outside the vehicle for each of the features or attributes of the persons. When the number of detected persons inside the vehicle matches the number of detected persons outside the vehicle, the loading situation recognizer 136 permits the autonomous parking controller 142 to start travel of the host vehicle M (step S311).

On the other hand, when the number of detected persons inside the vehicle does not match the number of detected persons outside the vehicle in step S311, the notification controller 150 notifies the inside of the vehicle that all the persons are not present (step S313). The loading situation recognizer 136 determines whether or not the occupant of the host vehicle M has permitted to the start of travel (step S315). When the start of travel of the host vehicle M has been permitted by the occupant of the host vehicle M in step S315, the loading situation recognizer 136 determines whether the derived number of detected baggage inside the vehicle matches the number of detected baggage outside the vehicle derived by the object-to-be-loaded recognizer 134 (step S317). Here, the loading situation recognizer 136 may determine whether or not the derived number of detected baggage inside the vehicle matches the number of detected baggage outside the vehicle for each of features or attributes of the baggage. When the derived number of detected baggage inside the vehicle matches the number of detected baggage outside the vehicle, the loading situation recognizer 136 permits the autonomous parking controller 142 to start travel of the host vehicle M (step S311).

On the other hand, when the derived number of detected baggage inside the vehicle does not match the number of detected baggage outside the vehicle in step S317, the notification controller 150 notifies the inside of the vehicle that loading of baggage is likely to be forgotten (step S319). Then, the loading situation recognizer 136 determines whether or not the occupant of the host vehicle M has permitted to the start of travel (step S321). When the start of travel of the host vehicle M has been permitted by the occupant of the host vehicle M in step S321, the loading situation recognizer 136 instructs the autonomous parking controller 142 to start of travel of the host vehicle M (step S311). The present invention is not limited to this process flow, and the loading situation recognizer 136 has performed confirmation of matching of the numbers of persons and matching of the baggage in parallel, and then, the notification controller 150 may notify the inside of the vehicle that persons or baggage is not present, such that an operation of permitting the start of travel from the occupant can be performed once.

The present invention is not limited thereto, and the loading situation recognizer 136 may recognize that all of the objects to be loaded have not been loaded into the host vehicle M, on the basis of, for example, the image captured by the outside-vehicle camera 10. For example, the loading situation recognizer 136 recognizes that all the objects to be loaded have been loaded into the host vehicle M on the basis of information indicating the surroundings situation of the outside of the vehicle before the boarding and information indicating the surroundings situation of the outside of the vehicle after the boarding completion operation. The loading situation recognizer 136 recognizes a person or baggage present in a wide range around the host vehicle M as the surroundings situation of the host vehicle M before the boarding and recognizes a person or baggage present in a narrow range around the host vehicle M as the surroundings situation of the host vehicle M after the boarding completion operation. The loading situation recognizer 136 recognizes the surroundings situation of the host vehicle M after the boarding completion operation on the basis of, for example, an image obtained by imaging the vicinity of the door of the host vehicle M. When a person or baggage having the same feature as the occupant candidate or baggage candidate recognized before boarding has not been recognized near the door after the boarding completion operation, the loading situation recognizer 136 recognizes that all of the objects to be loaded are loaded into the host vehicle M. A recognition target of the loading situation recognizer 136 is not limited thereto. For example, when the person or baggage having the same feature as the occupant candidate or baggage candidate recognized before boarding has been recognized near the door after the boarding completion operation, the loading situation recognizer 136 may recognize that the occupant has not boarded or that the baggage has not been loaded.

Figure 8:
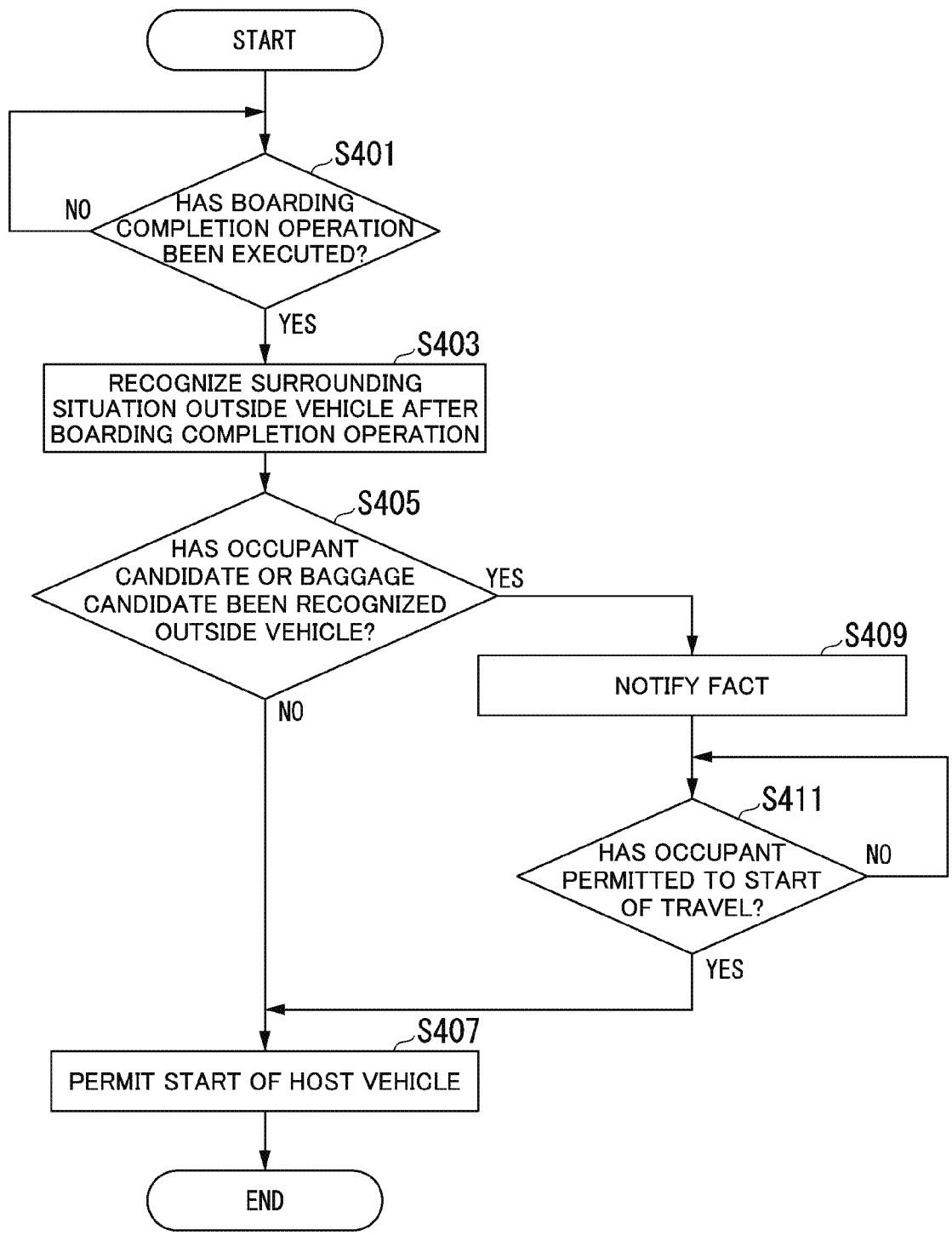
FIG. 8 is a flowchart showing another example of the process of the loading situation recognizer.

In the above-described process, the loading situation recognizer 136 determines whether or not the boarding or loading of the occupant candidate or the baggage candidate recognized outside the vehicle has been completed on the basis of a detection result of an in-vehicle situation. The present invention is not limited thereto, and the loading situation recognizer 136 may determine whether or not the boarding or loading of the occupant candidate or baggage candidate recognized outside the vehicle has been completed on the basis of a recognition result of the outside of the vehicle without referring to a detection result of the in-vehicle situation. Hereinafter, an example of this process will be described with reference to FIG. 8. FIG. 8 is a flowchart showing another example of the process of the loading situation recognizer 136. This process is executed in parallel with the process described above with reference to FIGS. 5 and 6.

The loading situation recognizer 136 determines whether or not the boarding completion operation has been executed (step S401). When the boarding completion operation has been executed, the loading situation recognizer 136 recognizes a surroundings situation of the outside of the vehicle after the boarding completion operation (step S403). The loading situation recognizer 136 determines whether or not the occupant candidate or the baggage candidate recognized by the object-to-be-loaded recognizer 134 has been recognized outside the vehicle after the boarding completion operation (step S405). When the occupant candidate or the baggage candidate has not been recognized outside the vehicle, the loading situation recognizer 136 instructs the autonomous parking controller 142 to start of travel of the host vehicle M (step S407).

On the other hand, when the occupant candidate or the baggage candidate has been recognized outside the vehicle in step S405, the notification controller 150 notifies the inside of the vehicle of the fact (for example, all the occupants are not present or that loading of baggage is likely to be forgotten) (step S409). The loading situation recognizer 136 determines whether or not the occupant of the host vehicle M has permitted the start of travel (step S411). When the start of travel of the host vehicle M has been permitted by the occupant of the host vehicle M in step S411, the autonomous parking controller 142 permits the start of travel of the host vehicle M (step S407).

The present invention is not limited thereto, and the loading situation recognizer 136 may recognize the surroundings situation of the host vehicle M on the basis of an image at the same viewpoint. The image at the same viewpoint includes, for example, an image captured by the outside-vehicle camera 10, which is a bird's eye image of the host vehicle M as if the host vehicle M is looked down from above.

The loading situation recognizer 136 recognizes the surroundings situation of the host vehicle M on the basis of, for example, a bird's eye image captured immediately before the host vehicle M stops at the stop position or between the stop of the host vehicle M and arrival of the occupant candidate. The loading situation recognizer 136 recognizes the surroundings situation of the host vehicle M after the boarding completion operation on the basis of, for example, a bird's eye image captured after the occupant has boarded the host vehicle M. When a person or baggage, which is not present in a surroundings situation of the host vehicle M before boarding, appears in the surroundings situation of the host vehicle M after the boarding completion operation, the loading situation recognizer 136 recognizes whether all of the objects to be loaded have not been loaded.

Figure 9:
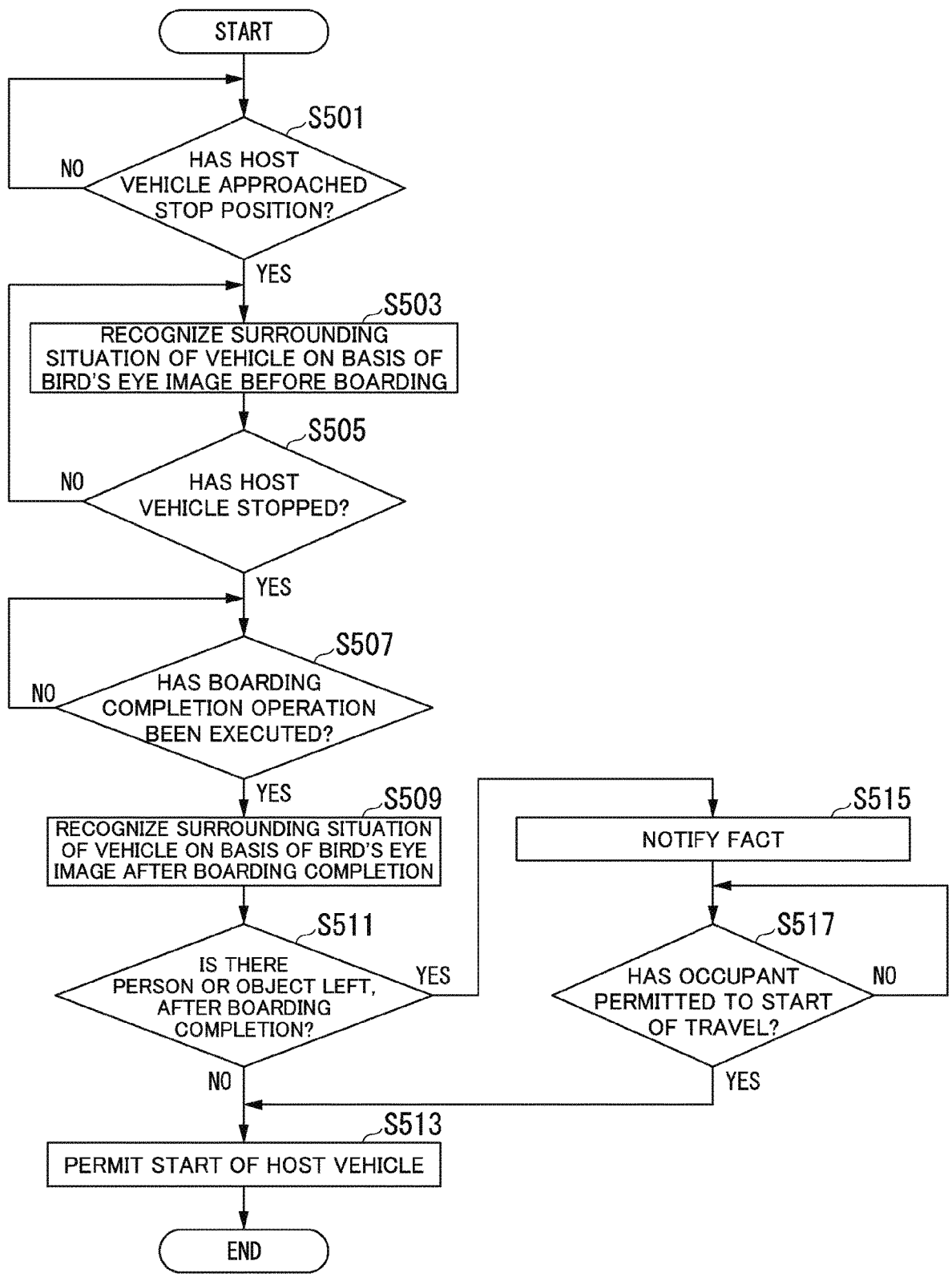
FIG. 9 is a flowchart showing still another example of the process of the loading situation recognizer.

FIG. 9 is a flowchart showing another example of the process of the loading situation recognizer 136. The loading situation recognizer 136 determines whether or not the host vehicle M has approached the stop position (step S501). For example, when the vehicle has entered the stop area 310, the loading situation recognizer 136 determines that the host vehicle M has approached the stop position.

When the host vehicle M has approached the stop position, the loading situation recognizer 136 recognizes the surroundings situation of the outside of the vehicle on the basis of a bird's eye image before boarding (step S503). For example, the loading situation recognizer 136 recognizes an installed object, baggage, or the like around the host vehicle M. Then, the loading situation recognizer 136 determines whether or not the host vehicle M has stopped (step S505). The loading situation recognizer 136 repeats the process of step S503 until the host vehicle M stops.

When the host vehicle M stops, the loading situation recognizer 136 determines whether or not the boarding completion operation has been executed (step S507). When the boarding completion operation has been executed, the loading situation recognizer 136 recognizes the surroundings situation of the outside of the vehicle on the basis of a bird's eye image after the boarding completion operation (step S509). The loading situation recognizer 136 determines whether or not there is a person or an object left outside the vehicle after the boarding completion operation on the basis of a comparison result between a recognition result before the boarding in step S503 and a recognition result after the boarding completion operation in step S509 (step S511). The loading situation recognizer 136 may extract a difference between the bird's eye images and detect a remaining person or object and may determine whether a person or object recognized after the boarding completion operation is present before the boarding. When there is no person or object left outside the vehicle after the boarding completion operation, the autonomous parking controller 142 permits start of travel of the host vehicle M (step S513).

On the other hand, when there is a person or object left outside the vehicle after the boarding completion operation in step S511, the notification controller 150 notifies the inside of the vehicle of the fact (for example, all the occupants are not present or that loading of baggage is likely to be forgotten) (step S515). The loading situation recognizer 136 determines whether or not the occupant of the host vehicle M has permitted the start of travel (step S517). When the start of travel of the host vehicle M has been permitted by the occupant of the host vehicle M in step S517, the autonomous parking controller 142 permits the start of travel of the host vehicle M (step S513).

When a specific item has been recognized near the door of the host vehicle M after the boarding completion operation, the loading situation recognizer 136 may recognize that all of the objects to be loaded have not been loaded. The specific item includes, for example, shoes, socks, hats, gloves, and umbrellas. The specific item may be registered in advance or set by the user. Baggage recognized as a "left-behind object" before a previous time may be registered as the specific item.

Conclusion of Embodiment

As described above, the automated driving control device 100 according to the present embodiment includes a recognizer 130 configured to recognize at least a surroundings situation and an in-vehicle situation of a vehicle; a driving controller (140, 160) configured to perform at least one of speed control and steering control of the vehicle on the basis of a recognition result of the recognizer 130, wherein the recognizer 130 recognizes an object to be loaded including at least any one of an occupant candidate present outside the vehicle and scheduled to board the vehicle and a baggage candidate present outside the vehicle and scheduled to be loaded into the vehicle, and recognizes that the object to be loaded has been loaded into the vehicle, and the driving controller permits start of travel of the vehicle when the recognizer 130 has recognized that the object to be loaded has been loaded into the vehicle, thereby preventing forgetting to load baggage or persons to board from being left outside the vehicle at the start of automated driving.

[Hardware Configuration]

Figure 10:
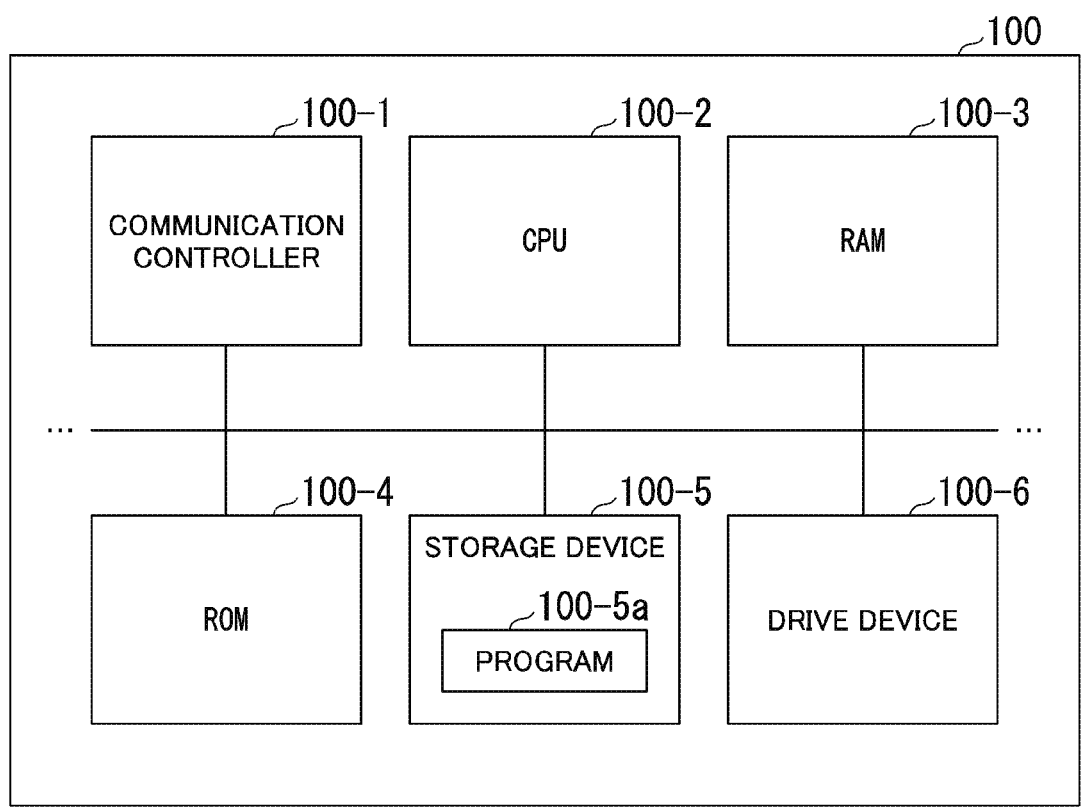
FIG. 10 is a diagram showing an example of a hardware configuration of an automated driving control device according to the embodiment.

FIG. 10 is a diagram showing an example of a hardware configuration of the automated driving control device 100 according to the embodiment. As shown in FIG. 14, the automated driving control device 100 has a configuration in which a communication controller 100-1, a CPU 100-2, a random access memory (RAM) 100-3 that is used as a working memory, a read only memory (ROM) 100-4 that stores a boot program or the like, a storage device 100-5 such as a flash memory or a hard disk drive (HDD), a drive device 100-6, and the like are connected to each other by an internal bus or a dedicated communication line. The communication controller 100-1 communicates with components other than the automated driving control device 100. A program 100-5*a* to be executed by the CPU 100-2 is stored in the storage device 100-5. This program is developed in the RAM 100-3 by a direct memory access (DMA) controller (not shown) or the like and executed by the CPU 100-2. Thereby, one or both of the first controller 120 and the second controller 160 are realized.

The embodiments described above can be represented as follows.

A vehicle control device includes a storage device storing a program, and a hardware processor configured to execute the program to recognize at least a surroundings situation of a vehicle, perform speed control and steering control of the vehicle without depending on an operation of an occupant on the basis of a recognition result, recognize an object to be loaded including at least any one of an occupant candidate to board the vehicle and a baggage candidate p scheduled to be loaded into the vehicle, recognize that the object to be loaded has been loaded into the vehicle, and permit start of travel of the vehicle when it has been recognized that the object to be loaded has been loaded into the vehicle.

While forms for carrying out the present invention have been described using the embodiments, the present invention is not limited to these embodiments at all, and various modifications and substitutions can be made without departing from the gist of the present invention.

What is claimed is:

1. A vehicle control device comprising a processor configured to execute a program to:
    recognize, as a recognition result, at least a surroundings situation and an in-vehicle situation of a vehicle;
    recognize at least one object to be loaded including at least any one of an occupant candidate present outside the vehicle and scheduled to board the vehicle and a baggage candidate present outside the vehicle and scheduled to be loaded into the vehicle on the basis of an image of an outside-vehicle camera configured to image the vicinity of the vehicle;
    recognize that the at least one object to be loaded has been loaded into the vehicle on the basis of a comparison result between the at least one object to be loaded recognized on the basis of the image of the outside-vehicle camera and a detection result of an in-vehicle detector configured to detect an in-vehicle status of the vehicle;
    initiate travel of the vehicle in a case where it has been recognized that the at least one object to be loaded has been loaded into the vehicle;
    derive a first number of the at least one object to be loaded based on the image of the outside-vehicle camera;
    determine that the first number matches a second number of the at least one object to be loaded which has been detected by the in-vehicle detector and loaded into the vehicle;
    recognize that the at least one object to be loaded has been loaded into the vehicle in a case where it has been recognized that the first number matches the second number; and
    perform one of speed control and steering control of the vehicle based on recognizing that the at least one object to be loaded has been loaded into the vehicle in the case where it has been recognized that the first number matches the second number.

2. The vehicle control device according to claim 1, wherein the processor is further configured to execute the program to:
    control an output to notify occupants of the vehicle that it has been recognized that all of objects to be loaded are not loaded into the vehicle in a case where it has been recognized that all of objects to be loaded are not loaded into the vehicle.

3. The vehicle control device according to claim 2, further comprising:
    a receiver configured to receive travel start permission from a user,
    wherein the processor is configured to execute the program to permit the start of travel of the vehicle in a case where the receiver receives a travel start permission of the user after the output is controlled.

4. The vehicle control device according to claim 1,
    wherein the processor is configured to execute the program to recognize that the at least one object to be loaded has been loaded into the vehicle on the basis of the detection result of the in-vehicle detector, and
    the in-vehicle detector includes at least one of a sensor configured to detect whether or not a seat belt of the vehicle has been used, a camera configured to image the inside of the vehicle, or a pressure sensor mounted on a seat of the vehicle.

5. The vehicle control device according to claim 1, wherein the processor is configured to execute the program to recognize a non-boarding person performing a predetermined action among persons recognized around the vehicle and to exclude the non-boarding person from the objects to be loaded.

6. The vehicle control device according to claim 1, further comprising:
    the outside-vehicle camera,
    wherein the processor is configured to execute the program to recognize that all of the objects to be loaded have been loaded into the vehicle on the basis of the image of the outside-vehicle camera.

7. The vehicle control device according to claim 6, wherein the processor is configured to execute the program to recognize that all of the objects to be loaded have been loaded into the vehicle on the basis of an image of the vicinity of a door of the vehicle or the vicinity of a baggage compartment of the vehicle.

8. The vehicle control device according to claim 6, wherein the processor is configured to execute the program to recognize that all of the objects to be loaded have not been loaded into the vehicle in a case where a predetermined item has been recognized near a door of the vehicle after the occupant candidates have boarded.

9. The vehicle control device according to claim 1, wherein the processor is configured to execute the program to recognize a constantly present object among objects recognized around the vehicle and to exclude the constantly present object from the objects to be loaded.

10. A vehicle control method using an in-vehicle computer, comprising:
    recognizing, as a recognition result, at least a surroundings situation and an in-vehicle situation of a vehicle;
    recognizing at least one object to be loaded including at least any one of an occupant candidate present outside the vehicle and scheduled to board the vehicle and a baggage candidate present outside the vehicle and scheduled to be loaded into the vehicle on the basis of an image of an outside-vehicle camera configured to image the vicinity of the vehicle;
    recognizing that the at least one object to be loaded has been loaded into the vehicle on the basis of a comparison result between the at least object to be loaded recognized on the basis of the image of the outside-vehicle camera and a detection result of an in-vehicle detector configured to detect an in-vehicle status of the vehicle;

initiating travel of the vehicle in a case where it has been recognized that the at least one object to be loaded has been loaded into the vehicle;

deriving a first number of the at least one object to be loaded based on the image of the outside-vehicle camera;

determining that the first number matches a second number of the at least one object to be loaded which has been detected by the in-vehicle detector and loaded into the vehicle;

recognizing that the at least one object to be loaded has been loaded into the vehicle in a case where it has been recognized that the first number matches the second number; and performing one of speed control and steering control of the vehicle based on recognizing that the at least one object to be loaded has been loaded into the vehicle in the case where it has been recognized that the first number matches the second number.

11. A non-transitory computer-readable storage medium storing a program, the program causing an in-vehicle computer to:

recognize, as a recognition result, at least a surroundings situation and an in-vehicle situation of a vehicle;

recognize at least one object to be loaded including at least any one of an occupant candidate present outside the vehicle and scheduled to board the vehicle and a baggage candidate present outside the vehicle and scheduled to be loaded into the vehicle on the basis of an image of an outside-vehicle camera configured to image the vicinity of the vehicle;

recognize that the at least one object to be loaded has been loaded into the vehicle on the basis of a comparison result between the at least one object to be loaded recognized on the basis of the image of the outside-vehicle camera and a detection result of an in-vehicle detector configured to detect an in-vehicle status of the vehicle;

initiate travel of the vehicle in a case where it has been recognized that the at least one object to be loaded has been loaded into the vehicle;

derive a first number of the at least one object to be loaded based on the image of the outside-vehicle camera;

determine that the first number matches a second number of the at least one object to be loaded which has been detected by the in-vehicle detector and loaded into the vehicle;

recognize that the at least one object to be loaded has been loaded into the vehicle in a case where it has been recognized that the first number matches the second number; and perform one of speed control and steering control of the vehicle based on recognizing that the at least one object to be loaded has been loaded into the vehicle in the case where it has been recognized that the first number matches the second number.

* * * * *